(12) United States Patent
Mollhagen

(10) Patent No.: US 7,832,363 B1
(45) Date of Patent: Nov. 16, 2010

(54) ADJUSTABLE LIVESTOCK ALLEYWAY

(76) Inventor: Jon Davis Mollhagen, Rte. 1 Box 63, Lorraine, KS (US) 67459

( * ) Notice: Subject to any disclaimer, the term of this patent is extended or adjusted under 35 U.S.C. 154(b) by 307 days.

(21) Appl. No.: 12/009,960

(22) Filed: Jan. 23, 2008

Related U.S. Application Data

(60) Provisional application No. 60/881,943, filed on Jan. 23, 2007.

(51) Int. Cl.
 *A01K 15/04* (2006.01)
(52) U.S. Cl. .................. 119/843; 119/752; 119/507
(58) Field of Classification Search ............... 119/738, 119/752, 843, 502, 751, 840, 507, 732, 733; 452/53
 See application file for complete search history.

(56) References Cited

U.S. PATENT DOCUMENTS

| | | | |
|---|---|---|---|
| 3,194,213 A | | 7/1965 | Soukup |
| 3,370,835 A | | 2/1968 | Crowson |
| 4,467,746 A | * | 8/1984 | Waldron ............... 119/733 |
| 4,502,414 A | * | 3/1985 | Paulsen ............... 119/507 |
| 4,513,690 A | * | 4/1985 | Waldron ............... 119/733 |
| 4,535,723 A | | 8/1985 | Gealy |
| 4,898,121 A | | 2/1990 | Reynolds |
| 5,158,041 A | * | 10/1992 | Schmitz ............... 119/751 |
| 5,184,572 A | * | 2/1993 | Meier ............... 119/733 |
| 5,263,438 A | * | 11/1993 | Cummings ............... 119/734 |
| 5,645,016 A | * | 7/1997 | Mahurin ............... 119/752 |
| 6,021,742 A | | 2/2000 | Cummings |
| 2005/0132978 A1 | * | 6/2005 | Bentz ............... 119/732 |

\* cited by examiner

*Primary Examiner*—Rob Swiatek
*Assistant Examiner*—Kristen C Hayes
(74) *Attorney, Agent, or Firm*—Robert O. Blinn

(57) ABSTRACT

An adjustable livestock alleyway includes an alleyway frame, a center frame and first and second panels which define two side by side alleyways within the alleyway frame. The first and second panels are pivotably mounted to the center frame to pivot between a first open position in which the panels are pivoted toward the center frame and a second constricted position in which the panel are pivoted away from the center frame. A linkage connecting between the center frame and the first and second panels is powered by an actuator in order to pivot the first and second panels between the first and second positions such that the widths of both side by side alleyways may be changed to a desired width.

5 Claims, 6 Drawing Sheets

ADJUSTABLE LIVESTOCK ALLEYWAY

CROSS REFERENCES TO RELATED APPLICATIONS

This application claims the benefit of U.S. Provisional Application No. 60/881,943 filed Jan. 23, 2007.

FIELD OF THE INVENTION

The present invention relates to livestock alleyway having adjustable panels for adjusting the widths of alleyways.

BACKGROUND OF THE INVENTION

Livestock alleyways have long been used to guide livestock animals for various purposes, such as, for example, guiding livestock into a squeeze chute for veterinary procedures. Livestock animals may vary in size and thus may not move efficiently when a small livestock animal is passing through an alleyway having a width for accommodating a large livestock animal. Still further, it often happens a livestock animal stalls in an alleyway thus obstructing movement for all of the animals in the process. Accordingly, what is needed is an alleyway having a panels that may be translated to vary the width of the alleyway. Moreover, what is needed are adjustable livestock alleyways which are positioned side by side so that when one animal obstructs movement the other alleyway may be used for continued movement while the stalled animal is urged to move forward.

SUMMARY OF THE INVENTION

The side by side adjustable livestock alleyway of the present invention meets the above described need. Adjustable panels are mounted within an alleyway frame having first and second side walls, entrances for receiving livestock into two alleyways and exits for discharging livestock from two alleyways. A center frame is located between the first and second side walls of the alleyway frame. First and second panels are pivotably mounted to opposite sides of the center frame. The first and second panels pivot between a first open position in which the panel is pivoted toward the center frame and a second constricted position in which the panel is pivoted away from the center frame. When a panel is in the first open position, the alleyway is relatively wide. When a panel is in the second constricted position, the alleyway is relatively narrow. Thus, the width of the alleyways may be adjusted to a selected width between the open and constricted positions

DETAILED DESCRIPTION

Figure 1:
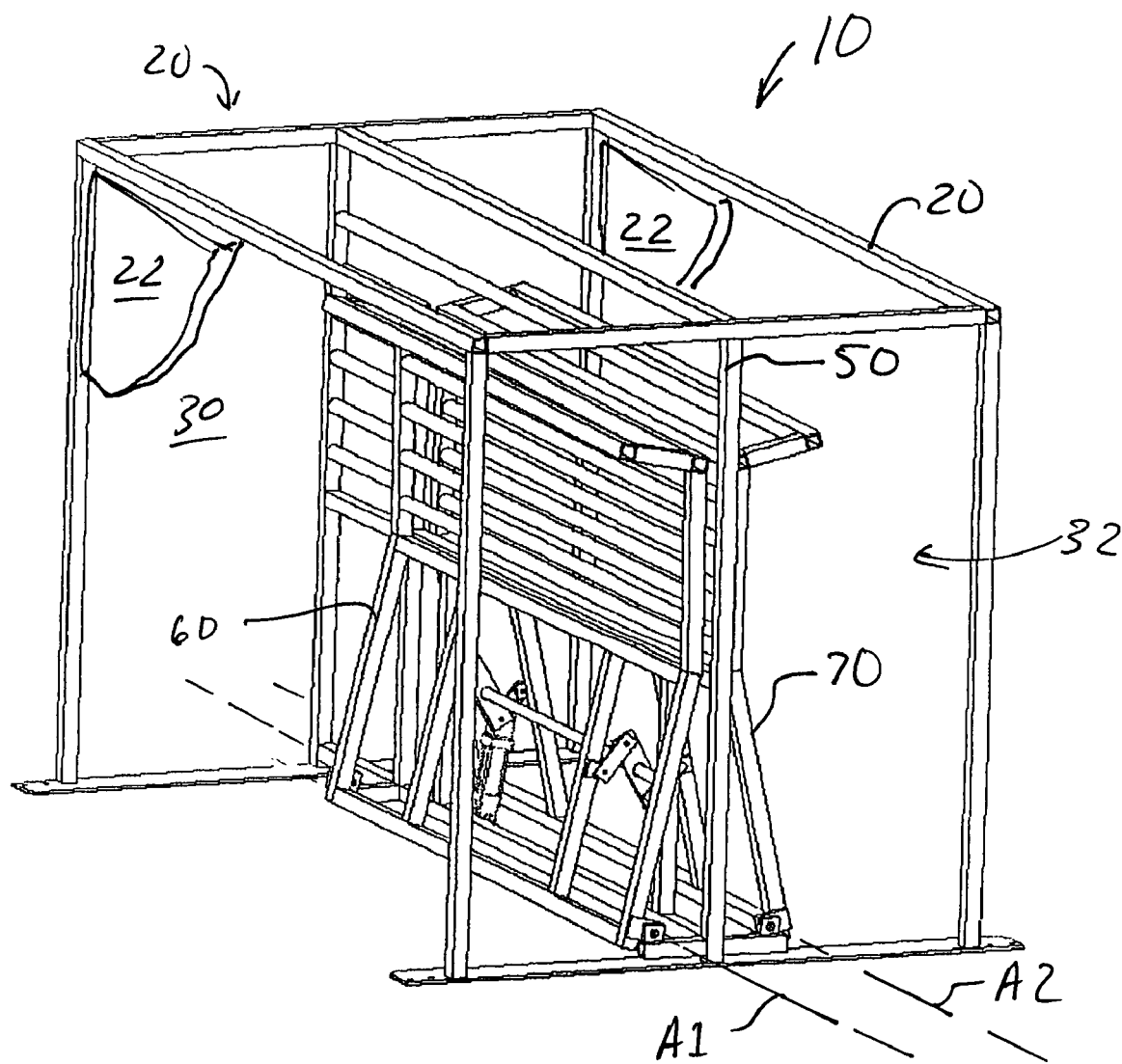
FIG. 1 is a perspective view of a livestock alleyway frame with adjustable panels shown with the panels in the first open position.
Figure 2:
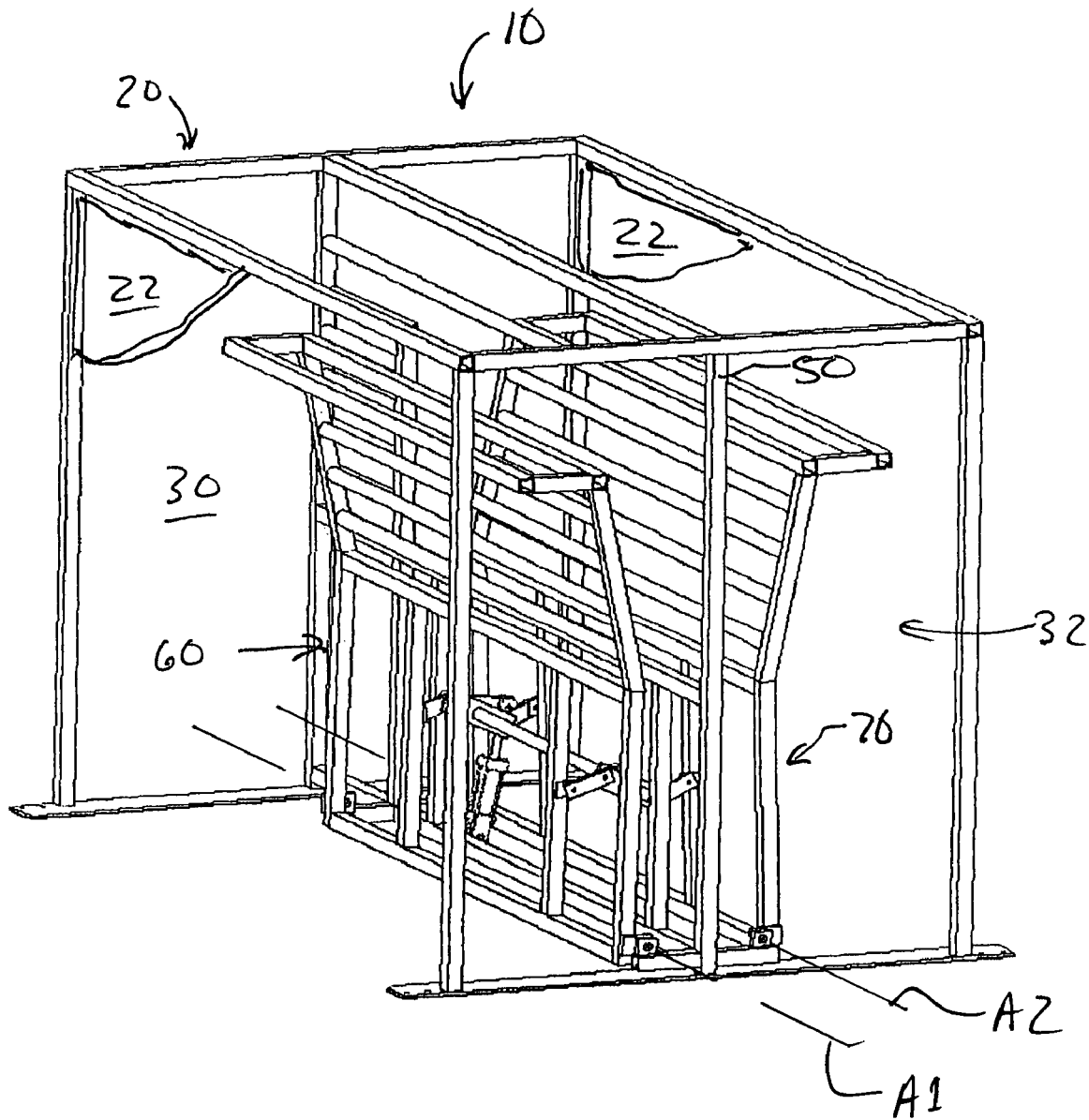
FIG. 2 is a perspective view of a livestock alleyway frame with adjustable panels shown with the panels in the second constricted position.

Referring to the drawings, FIG. 1 illustrates an adjustable livestock alleyway 10. Adjustable alleyway 10 includes a frame 20 having first and second side walls 22. First and second side walls 22 are shown in FIGS. 1 and 2 mostly broken away to expose other elements of adjustable alleyway 10. Adjustable alleyway frame 20 is preferably of welded tubular steel construction. Adjustable alleyway 10 further includes an entrance 30 for receiving livestock and an exit 32 for discharging livestock. A center frame 50 is located between the first and second side walls 22. A first panel 60 and a second panel 70 are pivotably mounted at their lower ends to the opposite sides of the center frame 50. As is the case with alleyway frame 20, the members of first and second panels 60 and 70 are preferably fashioned from welded tubular steel.

Figure 3:
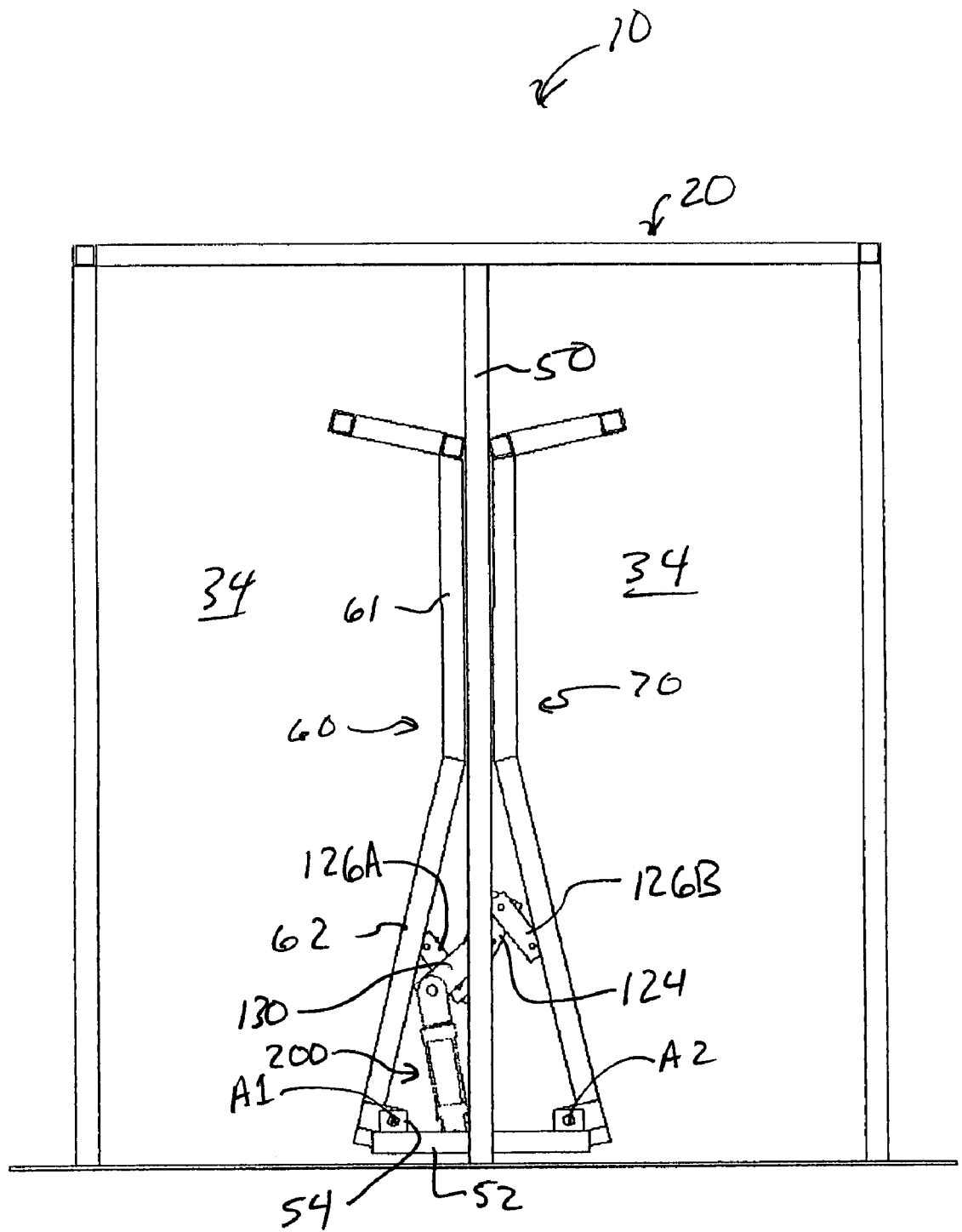
FIG. 3 is an end view of a livestock alleyway frame with adjustable panels shown with the panels in the first open position.
Figure 4:
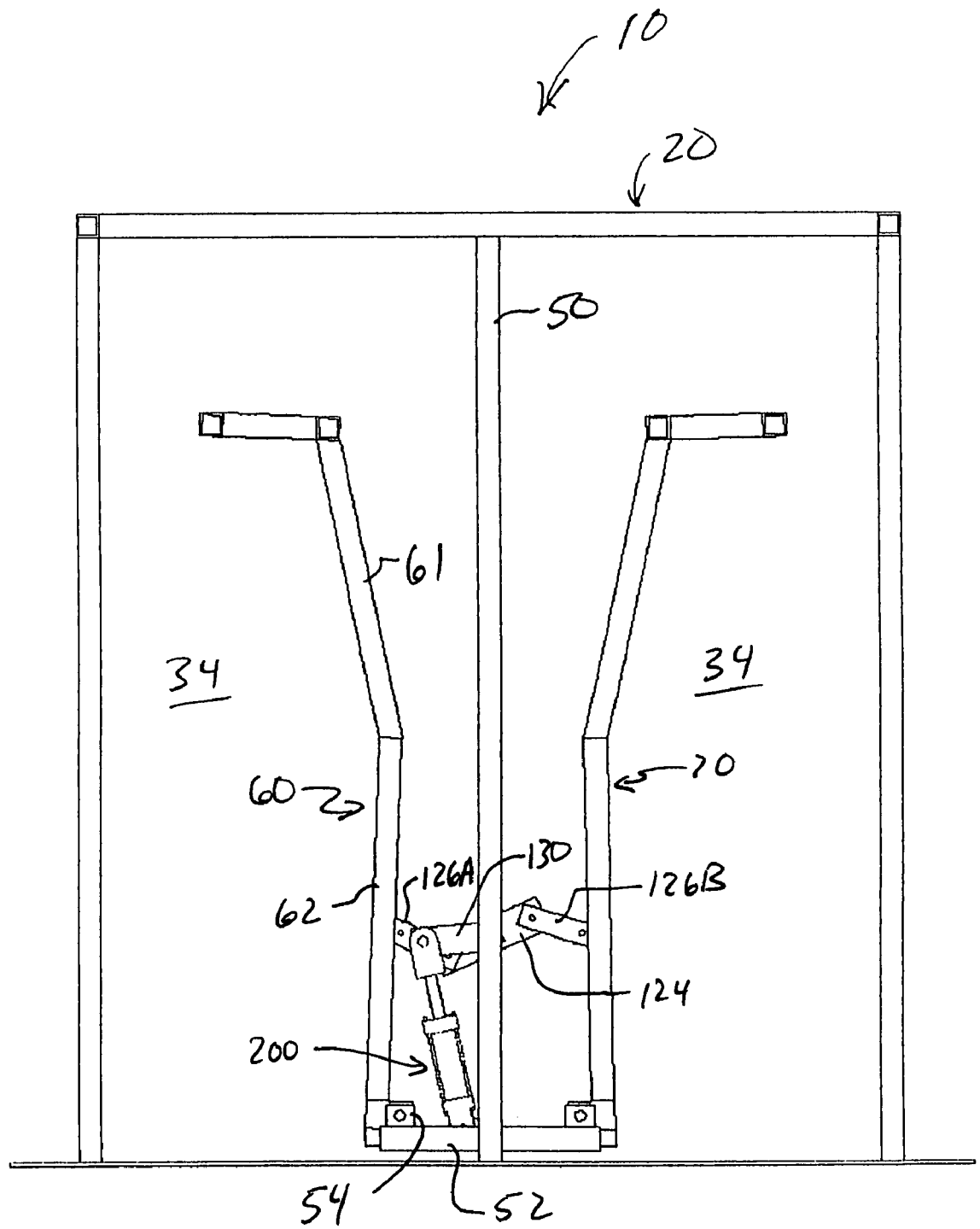
FIG. 4 is an end view of a livestock alleyway frame with adjustable panels shown with the panels in the second constricted position.

As can be best seen in FIGS. 1-4, first and second panels 60 and 70 pivot between a first open position shown in FIGS. 1 and 3 in which panels 60 and 70 are pivoted toward center frame 50 and a second constricted position shown in FIGS. 2 and 4 in which panels 60 and 70 are pivoted away from center frame 50. Thus, it is possible for an operator to pivot panels 60 and 70 to any position between the first open position shown in FIGS. 1 and 3 and the second constricted position shown in FIGS. 2 and 4. In this example embodiment first and second panels 60 and 70 move together between the above described open and constricted positions. This is movement is accomplished by rotating panels 60 and 70 about axis A1 and axis A2 which are both oriented longitudinally and horizontally as shown in FIGS. 1 and 2.

Figure 5:
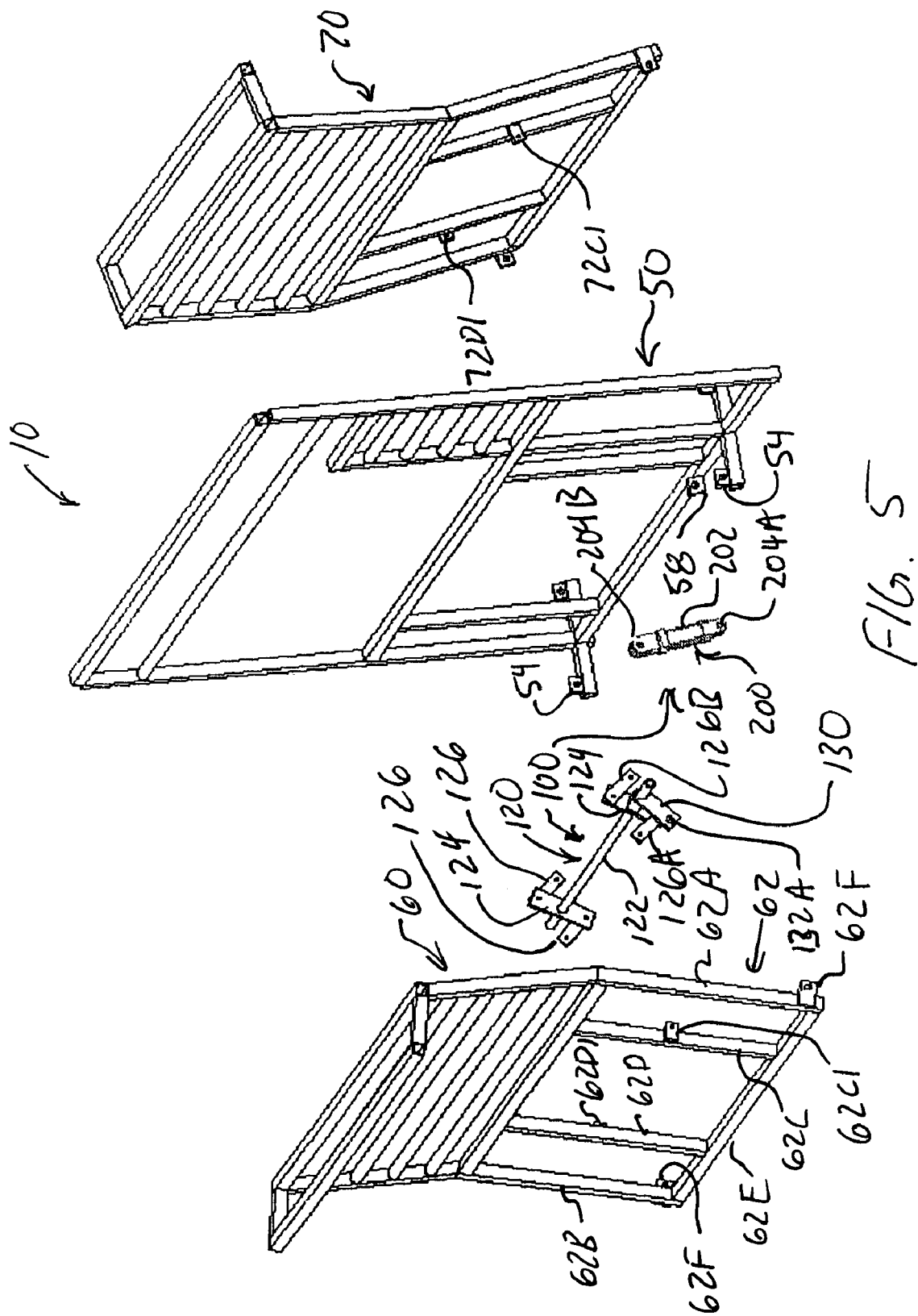
FIG. 5 is an exploded perspective view of a livestock alleyway frame shown with the linkage assembly removed from the center frame.
Figure 6:
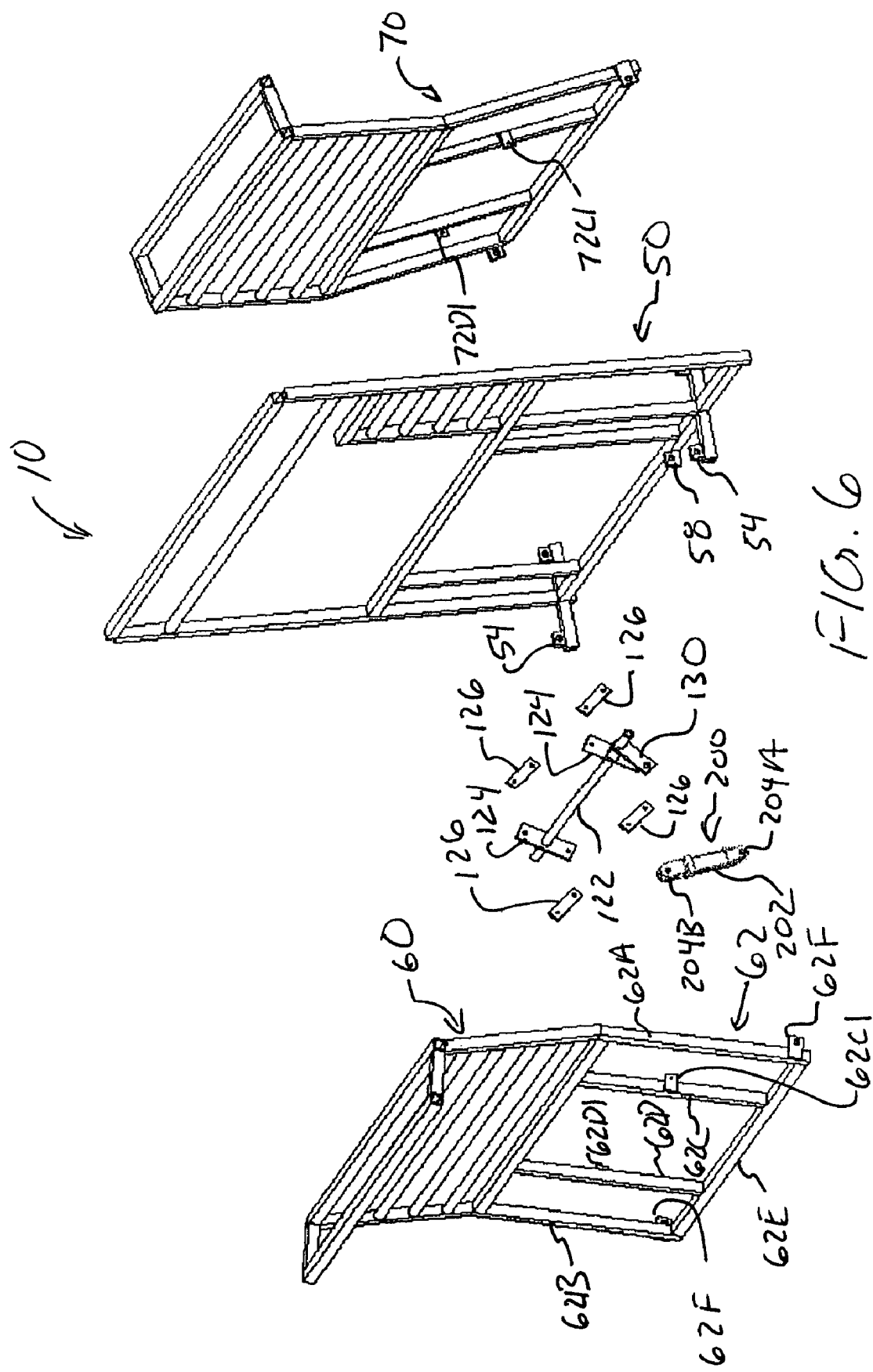
FIG. 6 is an exploded perspective view of a livestock alleyway frame shown with the linkage assembly removed from the center frame and partially disassembled.

Panel 70 is a symmetrical opposite of panel 60. Accordingly, panel 60 will be described in detail as the skilled reader also applies this detailed description to panel 70. As can be best seen in FIGS. 3 and 4, in this example embodiment, panel 60 includes an upper portion 61 which is generally parallel to center frame 50 when panel 60 is in the first open position and a lower portion 62 which angles away from center frame 50 when panel 60 is in the first open position. The lower end of lower portion 62 is pivotably attached at each end of frame 20 to a lower horizontal member 52 at each end of frame 20 by pivot tabs 54 for rotation about axis A1. Axis A1 is preferably spaced away from center frame 50 as shown in FIGS. 1 and 2. As can be seen in FIG. 5, lower portion 62 includes two side members 62A and 62B, two spaced inside members 62C and 62D and a lower member 62E. A panel pivot tab 62F is attached to each lower end of lower portion 62 for pivotal mounting to pivot tabs 54 of center frame 50. Pivot linkage tabs 62C1 and 62D1 are fixed to inside members 62C and 62D respectively. The function of pivot linkage tabs 62C1 and 62D1 will be described in greater detail below.

A pivot mechanism 100 for pivoting panels 60 and 70 between the first open position shown in FIGS. 1 and 3 and the second constricted position shown in FIGS. 2 and 4 connects between panels 60 and 70 and frame 50. Pivot mechanism 100 includes a pivot linkage assembly 120 and a hydraulic cylinder assembly 200 which will be described in greater detail below. Pivot linkage assembly further includes a pivot shaft 122, linkage members 124 and pivot links 126A and 126B. Pivot shaft 122 is pivotally mounted to center frame 50 and oriented in a longitudinal, horizontal fashion. Linkage members 124 are fixed to pivot shaft 122. Pivot links 126A and 126B pivotally connect at each of their opposite ends between the distal end of a linkage member 124 and one of linkage tabs 62C1 or 62D1. Pivot links 126A and 126B at the opposite ends of linkage members 124 are also connected to corresponding linkage tabs 72C1 and 72D1 of panel 70. A hydraulic pivot arm 130 is also fixed to pivot shaft 122 and includes a hole 132A at its distal end for receiving a connecting pin as will be described in greater detail below.

Motive power for rotating pivot shaft 122 and thus pivoting panels 60 and 70 between the first open position shown in FIGS. 1 and 3 and the second constricted position shown in FIGS. 2 and 4 is supplied by hydraulic cylinder assembly 200. Hydraulic cylinder assembly 200 includes a hydraulic cylinder 202 and opposite clevises 204A and 204B. Clevis 204A is adapted to connect with a cylinder pivot tab 58 fixed to center frame 50. Clevis 204B is also adapted to connect with hole 132A at the distal end of pivot arm 132. As can be seen by reviewing FIGS. 3 and 4, when hydraulic cylinder 202 extends from a first retracted position shown in FIG. 3 to a second extended position shown in FIG. 4, pivot shaft 122 rotates causing linkage members 124 to rotate thereby pushing against pivot links 126A and 126B to cause panels 60 and 70 to pivot from a first open position shown in FIG. 3 to a second constricted position shown in FIG. 4. This causes alleyways 34 shown in FIG. 3 to be narrowed as shown in FIG. 4. The skilled reader should note the extension of hydraulic cylinder 202 may be stopped at any point in its range of travel to select desired widths for alleyways 34.

The objectives of the invention are met by the example embodiment described above. Alleyways 34 may be adjusted to accommodate animals of varying sizes and to encourage animals to exit the alleyways. This adjustment may is preferably accomplished remotely as hydraulic fluid is supplied to hydraulic cylinder 202. The above described capability of adjusting the widths of side by side alleyways 34 is useful to operators for several reasons. Typically, those working with livestock animals will work with groups of animals in a limited size range. Thus small calves may be worked as a group as may large steers be worked as a group. Thus, for example, side by side alleyways 34 may be narrowed for a group of calves and then later widened for a group of steers. Fitting the widths of alleyways 34 to a group of animals is useful because if the width of the alleyway fits the animal, the animal is less likely to attempt to turn around and go in the opposite direction. Animals, particularly cattle, may try to do turn around if they panic and become afraid of what they see and hear in front of them. Having two side by side alleyways is also useful. With only one alleyway, if one animal stalls, that animal can stop all of the animals until that animal can be urged to move on. This may also cause the other animals to stall and panic. With at least two side by side alleyways, a stalled animal may be urged forward while other animals continue to move. Further, one way to urge a stalled animal to move forward and to prevent the animal from even attempting to turn around is to constrict the alleyway, not necessarily sufficiently to physically squeeze the stalled animal, but to sufficiently to constrict the open volume around the animal to urge it to move forward. Thus two side by side adjustable alleyways provides an optimum apparatus for moving animals forward into another apparatus, such as a squeeze chute, where operations such as veterinary procedures, tagging and the like may be conducted.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An adjustable livestock alleyway, comprising;
   a) an alleyway frame having first and second side walls defining an entrance for receiving livestock and an exit for discharging livestock,
   b) a center frame located between the first and second side walls of the alleyway frame defining first and second side by side alleyways,
   c) first and second panels pivotably mounted at their lower ends to the alleyway frame at locations spaced away from the center frame, the first and second panels each pivoting about a longitudinal, horizontal axis of rotation which is spaced away from the center frame and toward the lower end of the alleyway frame such that the first and second panels rotate between a first open position in which the first and second panels are pivoted toward the center frame thereby causing the first and second side by side alleyways to increase in width for accommodating larger animals and a second constricted position in which the first and second panels are pivoted away from the center frame thereby causing the first and second side by side alleyways to decrease in width for accommodating smaller animals, and,
   d) a pivot mechanism operable for pivoting the first and second panels between the first open position and the second constricted position, whereby an operator may selective pivot the first and second panels in a pre-selected position between the first open position and the second constricted position.

2. The adjustable livestock alleyway of claim 1, wherein, the pivot mechanism further comprises:
   a) a linkage assembly including a linkage member having a first end and a second opposite end, the linkage member pivotably mounted to the center frame for rotation about a horizontal and longitudinal axis located between the first and second ends of the linkage member, a first pivot link connecting between the first end of the linkage member and the first panel and a second pivot link connecting between the second end of the center frame and the second panel, such that rotation of the linkage member about its axis of rotation causes the first and second panels to move between the first open position and the second constricted position,
   b) an actuator connecting to the center frame and at least indirectly to the linkage member for pivoting the linkage member between a first position for holding both the first and second panels in the first open position and a second position for holding both of the first and second panels in the second constricted position.

3. The adjustable livestock alleyway of claim 1, wherein, the pivot mechanism further comprises:
   a pivot linkage assembly including a longitudinal pivot shaft pivotally mounted to the center frame, at least one linkage member mounted to the pivot shaft having opposing distal ends spaced away from the pivot shaft, a first pivot link connecting between one of the distal ends of the linkage member and the first panel, a second pivot link connecting between the opposite one of the distal ends of the linkage member and the second panel such that rotation of the pivot shaft causes movement of the first and the second panels between the first open position and the second constricted position,
   and a hydraulic cylinder connecting to the alleyway frame at one end thereof and at least indirectly connected to the pivot shaft at the other end thereof for rotating the pivot shaft.

4. The adjustable livestock alleyway of claim 1, wherein, each of the first and second panels further comprise:

an upper portion which is generally parallel to center frame when the panel is in the first open position and a lower portion which angles away from the center frame the panel is in the open position.

5. The adjustable livestock alleyway of claim 1, wherein, the pivot mechanism includes a pivot linkage assembly including a longitudinal pivot shaft pivotally mounted to the center frame, at least one linkage member mounted to the pivot shaft having opposing distal ends spaced away from the pivot shaft, a first pivot link connecting between one of the distal ends of the linkage member and the first panel, a second pivot link connecting between the opposite one of the distal ends of the linkage member and the second panel such that rotation of the pivot shaft causes movement of the first and the second panels between the first open position and the second constricted position, a hydraulic cylinder connecting to the alleyway frame at one end thereof and at least indirectly connected to the pivot shaft at the other end thereof for rotating the pivot shaft, and, each of the first and second panels includes an upper portion which is generally parallel to center frame when the panel is in the first open position and a lower portion which angles away from the center frame the panel is in the open position.

* * * * *